United States Patent [19]

Eggert, Jr.

[11] 4,014,587
[45] Mar. 29, 1977

[54] CAR PLATFORM STRUCTURE

[75] Inventor: Walter S. Eggert, Jr., Huntingdon Valley, Pa.

[73] Assignee: The Budd Company, Troy, Mich.

[22] Filed: Oct. 8, 1975

[21] Appl. No.: 620,529

[52] U.S. Cl. ............................................. 296/28 F
[51] Int. Cl.$^2$ ...................................... B62D 27/00
[58] Field of Search ....................... 296/28 R, 28 F

[56] References Cited
UNITED STATES PATENTS 3,419,303  12/1968  Eggert et al. ..................... 296/28 F
3,455,595  7/1969  Wessells et al. .................. 296/28 F

*Primary Examiner*—Robert R. Song
*Assistant Examiner*—Gene A. Church

[57] ABSTRACT

Car platform chassis structure adapted to have an open-bottomed body balloon structure assembled thereon, the platform structure comprising main side sills extending beyond wheel-wells with inwardly displaced end portions at the wheel wells, the main side sills having a plurality of longitudinally spaced cross-members secured therebetween providing dash-firewall, front seat support and back seat support and vertically spaced horizontal plate-like members secured on cross-members therebetween to form a box-like structure in the front wheel-well zone, a floor pan secured beneath the cross-members between wheel-well zones, longitudinally spaced vertical bulkheads secured to the outer sides of the main side sills in the space between wheel-well zones, and outer auxiliary side sills between the wheel-well zones secured to the main side sills over the bulkheads, the hollow spaces of the side sills being filled, if desired, with rigidifying material, as of plastic foam, either pre-formed or injected.

8 Claims, 3 Drawing Figures

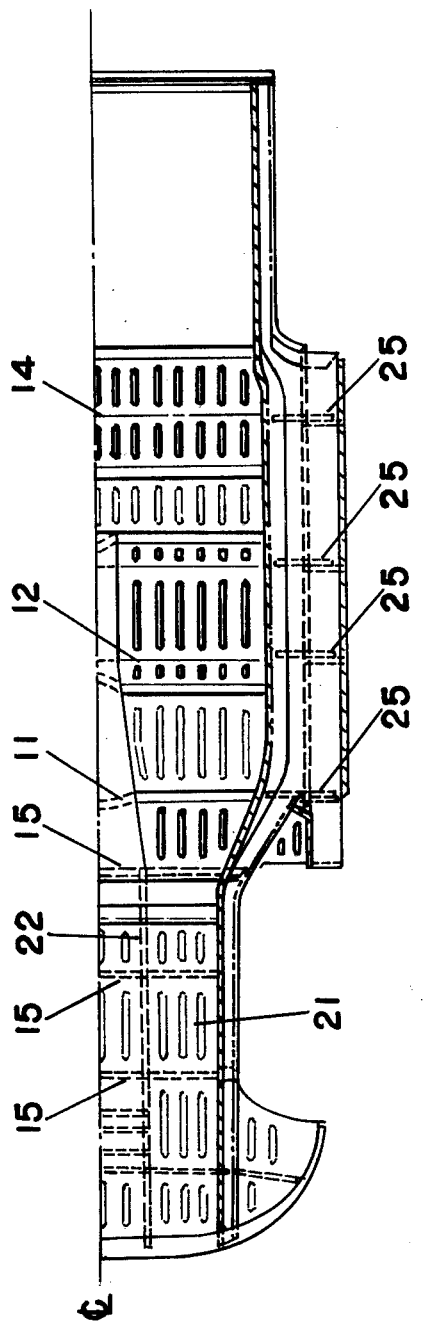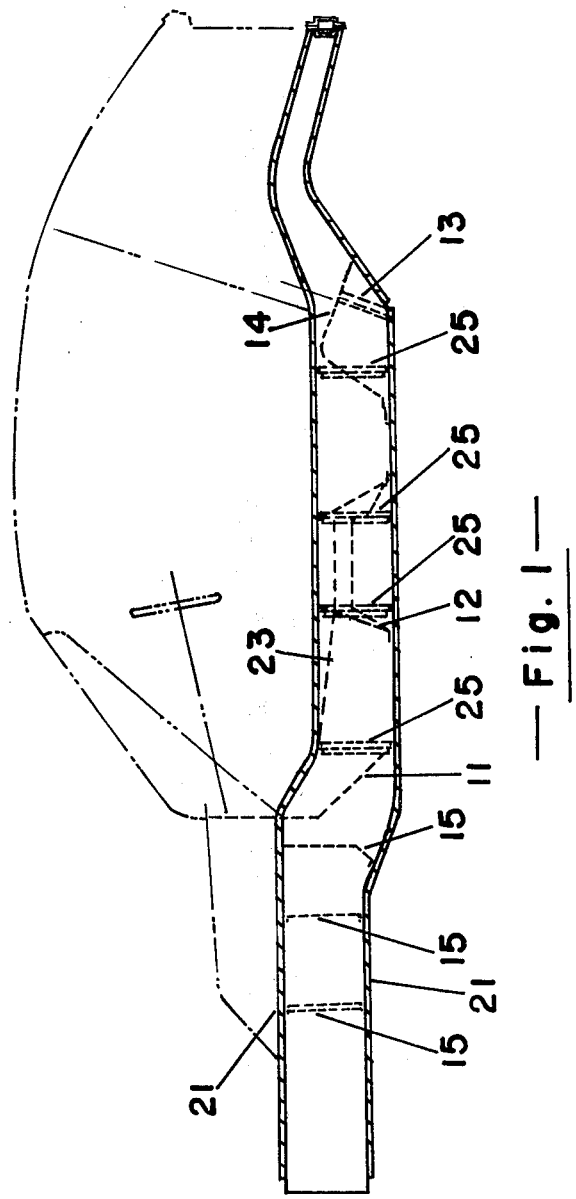

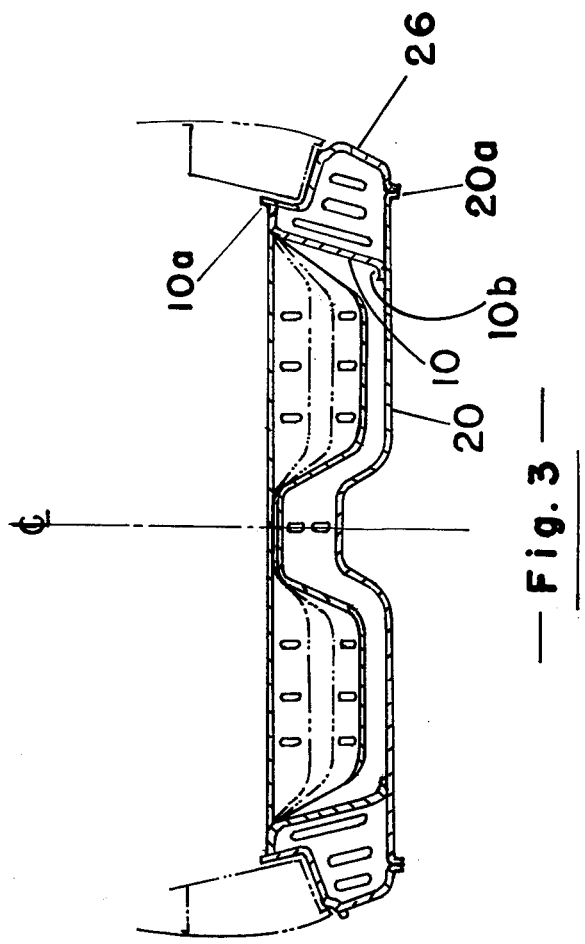

CAR PLATFORM STRUCTURE

BACKGROUND AND SYNOPSIS

In U.S. Pat. No. 3,419,303, Dec. 31, 1968, there is disclosed a platform-type underframe or chassis unit adapted to receive thereon an open-bottom body balloon. In that construction hollow side sills extend the full length of the body. The present construction is of the same general platform type but is simpler and easier to manufacture and assemble.

The present construction simplifies the side sill and platform construction by providing simple (non-box section) outwardly channeled main side sills extending the full length of the body over the wheel-well zones, making it simple and easy to secure cross-members and horizontal plates between the main side sills, then to secure a floor pan and associated tunnel structure between the cross-members. Longitudinally spaced vertically bulkheads can then be secured to the outer open sides of the main side sills between wheel-well zones; and an outer inwardly-open channel-shaped auxiliary outer side sill of a length to be received between wheel-well zones, is secured in mating flanges to the main side sill over the bulkheads. If desired, the space between the main side sill and the outer side sill can be filled with a rigidifying strengthening material, such for example as foamed plastic, either pre-formed or injected.

This construction provides a very rigid strong structure, especially in the door area between wheel-well zones, and permits of a very simple and convenient method of assembly.

DRAWINGS

The invention may be better understood from the following description of a specific exemplary embodiment, reference being made to the accompanying drawings thereof, wherein:

FIG. 1 is a side view of the platform structure;
FIG. 2 is a top plan view;
FIG. 3 is a transverse vertical section taken on the line 3—3 of FIG. 1.

SPECIFIC EMBODIMENT

The car platform structure herein shown comprises main side sills 10 of a length to extend fore and aft past the steel-well zones. These are treated as base members on which the platform is assembled. They are outwardly open, at least toward the top and terminate in a longitudinal top weld flange 10a. In the present specific form they have an inturned bottom flange 10b. In elevation (FIG. 1), the main side sills are low in the door-passenger zone and higher in the end wheel-well zones. In plan (FIG. 2), the main side sills are offset outwardly in the door-passenger zone and are offset inwardly in the end wheel-well zones. By being made simple (not box section) in form the main side sills allow easy access for connection with related parts. Only in final assembly do the side sills assume a box-section configuration in the door-passenger zone after the outer auxiliary side sills have been secured thereto.

When the main side sills 10 have been properly positioned there are secured between them a plurality of cross-members, these cross-members including a dash-firewall member 11, a front seat support 12, a rear seat support 13, a rear seat pan 14, a plurality of front cross-members 15, and one or more rear cross-members, (not shown).

After the cross-members have been secured to the main side sills a floor pan 20 is secured beneath the cross-members in the door-passenger zone. Upper and lower horizontal plates 21 (upper only shown) are secured to the front cross-members 15 to form a box-like structure. Some longitudinal vertical spacer members 22 are also provided in the box-like structure.

Intermediate the width of the cross-members and floor pan there is secured a tunnel structure 23 extending rearwardly from the dash-firewall for the passage of air and location of cables or other accessory elements.

In the present embodiment the sides of the floor panel 20 extend outwardly past the flanged lower edges of the main side sills and are provided with longitudinal flanges 20a for connection with flanges of outer sill members which will complete an intermediate box-like side sill structure, as will be described presently.

After the cross-members, floor pan, tunnel, and front box structures have been secured between the main side sills and before a box structure has been formed, that is while the main side sills are still accessible for making weld connections, there are secured to the outer sides of the main side sills and to the projecting edges of the floor pan a plurality of transverse vertical baffle members 25, as by welding thereto. The baffles are of a shape to fit within the final box-section shape of the side sills. These baffle members serve to strengthen and rigidify the final box-section sill structure and also hold in position a filling material, such for example as plastic foam, either pre-formed or injected.

After the baffle plates 25 have been secured to the main side sill members there are secured to the main side sills and projecting floor pan edges, over the baffle plates, outer auxiliary side sills 26 of a length to be disposed between the wheel-well zones. The outer edges of the baffle plates may be anchored to the outer side sills, as by bonding adhesive.

The outer side sills 26 have a special cross sectional formation in the door zone somewhat different from the cross sectional shape at the ends, as shown in the drawings.

At the front end the outer side sills 26 diverge from the inwardly inclined sides of the main side sills and the open space between is covered by cover members 27 secured between them and forming part of the front wheel wells. The rear may be similarly treated for the front of the rear wheel wells.

The structure disclosed provides a very rigid strong construction, especially beneficial for cars having wide doors and a narrow roof in the door zone, making it very resistant to damage by side collision impacts. It also provides for easy and convenient assembly.

While one embodiment of the invention has been described for purposes of illustration, it will be understood that there may be various embodiments and modifications within the general scope of the invention.

I claim:
1. A car platform structure adapted to receive thereon a body balloon assembly, comprising in combination, plain open-sided main side sills of a length to extend past the wheel well zones, cross-members secured to the main side sills, a floor pan secured beneath the cross bearers, an auxiliary outer side sill of a length to be disposed in the door-passenger space between wheel-well zones secured to the outer sides of said main side sills, a plurality of longitudinally spaced transverse vertical baffles secured to the outer sides of said main side sills in the door-passenger zone between wheel well zones, and said outer auxiliary side sills being secured to said main side sills over said spaced baffles.

2. A car platform structure as set forth in claim 1, wherein said cross-members comprise parts forming a dash-firewall structure, a front seat support structure, and a rear seat support structure.

3. A car platform structure as set forth in claim 1, wherein said floor pan has side portions extending outwardly in the door-passenger zone to form part of side sill box sections with said main side sills and said outer auxiliary sills.

4. A car platform structure as set forth in claim 1, which further includes a transversely medial tunnel structure extending rearwardly from the dash-firewall cross-member.

5. A car platform structure adapted to receive thereon a body balloon assembly, comprising in combination, plain open-sided main side sills of a length to extend past the wheel well zones, cross-members secured to the main side sills, a floor pan secured beneath the cross bearers, an auxiliary outer side sill of a length to be disposed in the door-passenger space between wheel-well zones secured to the outer sides of said main side sills, said main side sills having intermediate outwardly offset portions in the passenger-door zone, said outer auxiliary side sills being secured to said offset portions with one end spaced away from the main side sills, and members connecting the ends of the outer auxiliary side sills with the inwardly spaced portions of the main side sills.

6. A car platform structure as set forth in claim 5, wherein said cross-members comprise parts forming a dash-firewall structure, a front seat support structure, and a rear seat support structure.

7. A car platform structure as set forth in claim 5, wherein said floor pan has side portions extending outwardly in the door-passenger zone to form part of side sill box sections with said main side sills and said outer auxiliary sills.

8. A car platform structure as set forth in claim 5, which further includes a transversely medial tunnel structure extending rearwardly from the dash-firewall cross-member.

* * * * *